US008720075B2

(12) United States Patent
Young et al.

(10) Patent No.: US 8,720,075 B2
(45) Date of Patent: May 13, 2014

(54) POWER TAKEOFF GASKET SELECTION TOOLS AND METHODS

(75) Inventors: Brian Young, Tulsa, OK (US); John Rinkenbaugh, Coffeyville, KS (US); Jeremy Armstrong, Topeka, KS (US)

(73) Assignee: Muncie Power Products, Inc., Muncie, IN (US)

( * ) Notice: Subject to any disclaimer, the term of this patent is extended or adjusted under 35 U.S.C. 154(b) by 189 days.

(21) Appl. No.: 13/452,039

(22) Filed: Apr. 20, 2012

(65) Prior Publication Data

US 2012/0291298 A1 Nov. 22, 2012

Related U.S. Application Data

(60) Provisional application No. 61/477,438, filed on Apr. 20, 2011.

(51) Int. Cl.
*G01B 3/50* (2006.01)
(52) U.S. Cl.
USPC .......................................... 33/501.45; 33/563
(58) Field of Classification Search
USPC .......... 33/501.08, 501.45, 501.7, 501.11, 563
See application file for complete search history.

(56) References Cited

U.S. PATENT DOCUMENTS

| 2,362,808 | A | * | 11/1944 | Durgin | 33/501.08 |
|---|---|---|---|---|---|
| 2,780,872 | A | | 2/1957 | Mills | |
| 4,295,276 | A | | 10/1981 | Ellington | |
| 4,519,241 | A | * | 5/1985 | Hofler | 33/501.9 |
| 4,610,175 | A | | 9/1986 | Weis et al. | |
| 4,683,661 | A | * | 8/1987 | Sommer | 33/501.08 |
| 5,253,422 | A | * | 10/1993 | Zaveruha | 33/199 R |
| 5,794,476 | A | | 8/1998 | Smietanski | |
| 5,913,547 | A | | 6/1999 | Fernandez | |
| 6,108,923 | A | * | 8/2000 | Polkhovskiy | 33/501.45 |
| 2002/0162238 | A1 | * | 11/2002 | Bakke et al. | 33/501.45 |
| 2008/0276475 | A1 | * | 11/2008 | Schafer | 33/501.45 |
| 2011/0072675 | A1 | * | 3/2011 | Smith et al. | 33/501.08 |
| 2011/0185587 | A1 | * | 8/2011 | Lindner et al. | 33/606 |

* cited by examiner

*Primary Examiner* — G. Bradley Bennett
(74) *Attorney, Agent, or Firm* — Daniel L. Boots; Douglas G. Gallagher; Bingham Greenebaum Doll LLP

(57) ABSTRACT

Devices and methods to facilitate proper installation of a power takeoff on a transmission are disclosed. Embodiments include gauges and methods that enable users to properly select the thickness of the gasket between the power takeoff and the transmission housing to minimize gear backlash and gear interference while installing a power takeoff on a transmission. In one embodiment, the gauge is of unitary construction with at least one surface adapted to contact the transmission housing and another surface adapted to avoid contact with the transmission gear by at least $2/1000$ inches and at most $3/100$ inches when the gasket thickness is proper for minimizing gear backlash and interference. Alternate embodiments include cutouts that aid in aligning the gauge within the transmission housing and can assist in determining the appropriate gasket thickness.

35 Claims, 5 Drawing Sheets

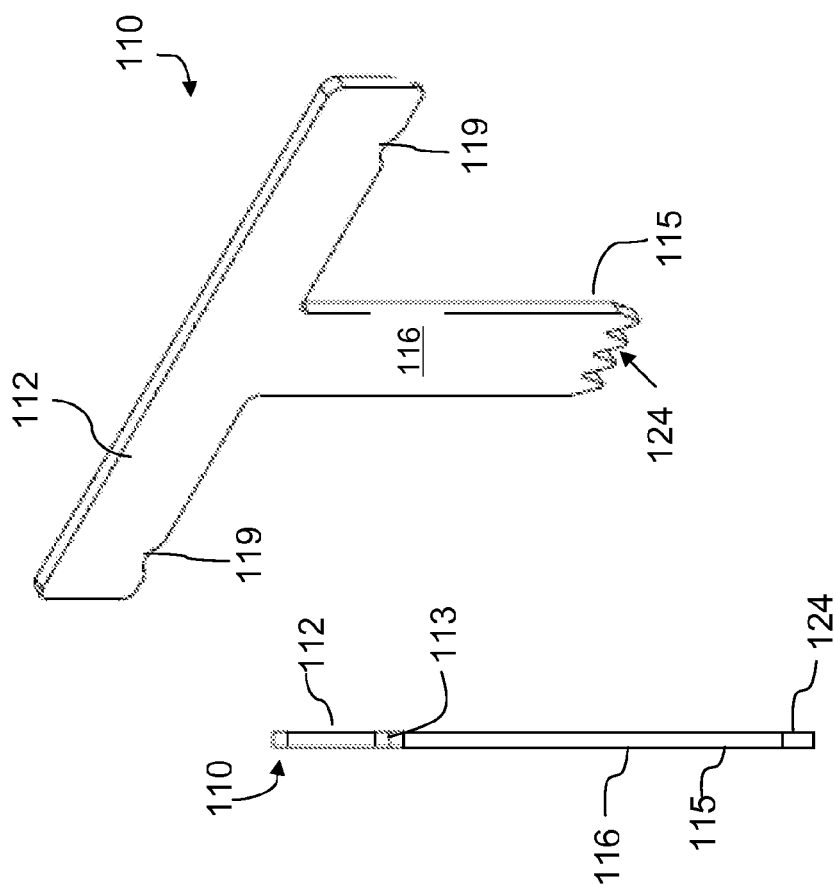
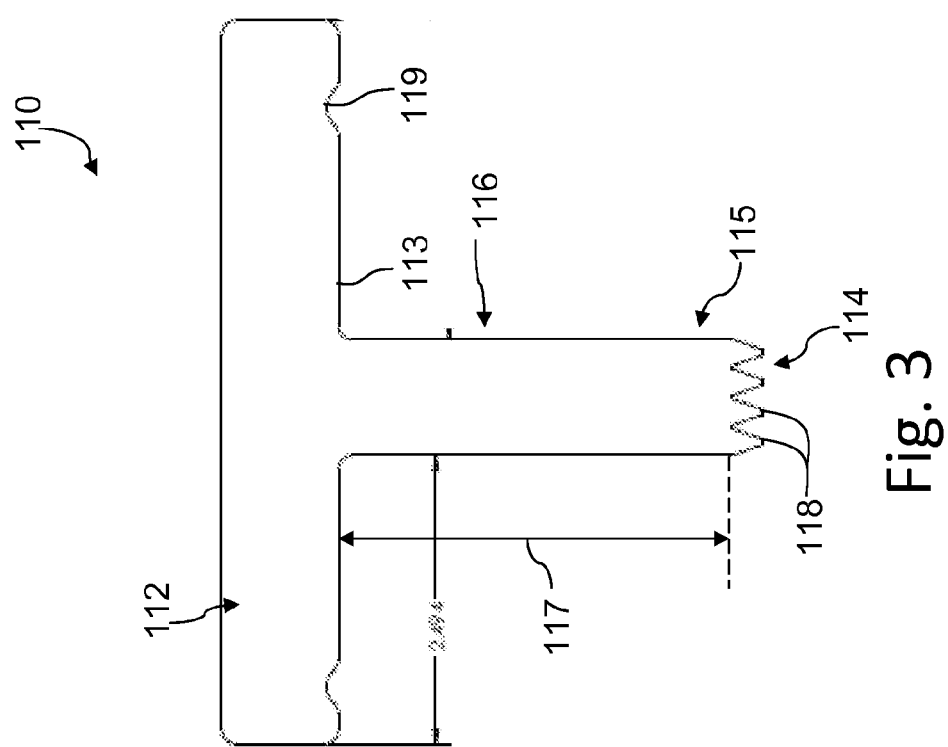
Fig. 3
Fig. 4
Fig. 5

POWER TAKEOFF GASKET SELECTION TOOLS AND METHODS

This application claims the benefit of U.S. Provisional Application No. 61/477,438, filed Apr. 20, 2011, the entirety of which is hereby incorporated herein by reference.

FIELD

Embodiments of this disclosure relate to power takeoff ("PTO") devices installed on transmissions and, more particularly, to gauges that enable the user to properly select a gasket thickness that controls gear backlash and gear interference of a PTO device when installed on a transmission.

BACKGROUND

A "power takeoff" device, commonly referred to simply as a "PTO," is typically mounted to a transmission with a gasket positioned between the PTO housing and the transmission housing. Mounting the PTO to the transmission, which is typically accomplished using bolts, commonly requires mating adjacent flanges of the PTO and the transmission with a gasket therebetween in order to seal the bolted joint. Selection of a proper gasket thickness can control the PTO gear center distance, which affects "backlash" and gear interference between the meshing PTO and transmission gears.

Backlash, sometimes called "lash" or "play," is the lost motion between the respective mating gear teeth of the PTO and the transmission. Backlash can also be described as the clearance between such mating gears, or as the amount of lost motion due to clearance or slackness when movement is reversed and contact between the respective gears is re-established. Backlash may be measured in different manners, such as along the line of action or on the pitch cylinder of the gears. Factors affecting the extent of backlash in meshing gears include the actual center distance at which the gears operate and the manufactured tooth thickness. Excessive backlash can cause rattle noise, especially in systems that may be prone to rattle, and excessive wear. On the other hand, an absence of any backlash (tightly meshed gears) can cause excessive noise, such as whining, and excessive wear.

Selection of a proper gasket thickness can play an important role in properly coupling a PTO to a transmission. Excessive gasket thickness can result in too much backlash, which as noted can cause excessive rattle and wear on the gears. Insufficient gasket thickness will allow the PTO center distance to be reduced to a point where gear interference may occur, which can occur unintentionally during mounting, especially in situations where it is easy to force the gears together such as when a PTO is bolted to the transmission. Gear interference can cause noisy operation or, in more severe situations, result in catastrophic failure of the gears, the PTO and/or the transmission.

SUMMARY

An objective of certain embodiments of this disclosure is to select the proper gaskets that control gear backlash and interference of a PTO device when installed on a transmission. More specifically, the device and method provided by this disclosure are used to select the proper gasket thickness for PTO installation.

Embodiments of the present disclosure control the selection of the gasket by referencing a known controlled dimension on the transmission gear to the face of the transmission housing where the PTO mounts. Selection of a correct gasket can be simplified using a flat, generally T-shaped, elongated implement.

In certain example embodiments, a surface, which may be curved, is adapted to abuttingly engage and mate with the transmission gear, is formed in one end of the implement. A lateral cross portion adapted to abuttingly engage the PTO mounting surface at the PTO opening of the transmission housing is formed at an opposing end of the implement with the surfaces generally facing in a similar direction. In another embodiment using this device, the user places the intended gaskets on or about the PTO opening. Thereafter, the user inserts the device through the PTO opening whereupon either the transmission gear engagement end of the device abuttingly engages the outside diameter of the transmission gear, or the gasket/housing engagement end of the device engages the PTO mounting surface or the gaskets placed at the PTO mounting surface. In the event the device engages the transmission gear, more gasket thickness can be added at the PTO opening. In the event the device engages a gasket, gasket thickness can be decreased at the PTO opening until an appropriate gap between the transmission gear engaging surface of the device and the transmission gear is achieved.

In some embodiments, an appropriate gasket thickness is achieved when the device engages the gasket and avoids engaging the transmission gear by a minimal distance (in other words, forms a gap of), for example, two thousandths of an inch ($2/1000$ inches) to three thousandths of an inch ($3/1000$ inches). In still other embodiments, an appropriate gasket thickness is achieved when the device engages the gasket and the transmission gear. Once the gasket thickness is appropriate, the transmission engaging end of the device will have minimal clearance from (will not engage) the transmission gear and the PTO may then be installed with the assurance that gear interference will not occur and PTO backlash will be minimal.

Since it may be difficult for a user to know when the appropriate gap is achieved, the user can begin with a gasket thickness that is insufficient with the transmission gear engaging surface of the device contacting the transmission gear, then incrementally increase the gasket thickness until there is no contact between transmission gear engaging surface of the device and the transmission gear when the lateral cross portion of the device abuts the PTO mounting surface.

Particular benefits may be achieved when using embodiments of this disclosure to determine the proper gasket thickness when installing power takeoff units on transmissions that are already installed on vehicles. The configuration of various embodiments allow users to determine proper gasket thickness in situations where the transmission's PTO attachment location (mounting surface) is in a location that is difficult to access or view by the user.

Example embodiments includes a tool of unitary construction for determining the thickness of one or more gaskets to be mounted between a power takeoff and a transmission, the power takeoff including a surface for engaging the transmission housing and a gear for engaging a gear in the transmission, the tool including a gear engaging surface configured and adapted to abuttingly engage the gear in the transmission, and a housing engaging surface configured and adapted to abuttingly engage the transmission housing. Optionally, the distance between the gear engaging surface and the housing engaging surface equals the distance between the power takeoff surface for engaging the transmission housing and the power takeoff gear for engaging the gear in the transmission. The tool may be T-shaped with the gear engaging surface being on the bottom of the T and the housing engaging surface being on the top cross-member portion of the T and/or generally flat. The gear engaging surface may be, at least in part, curved, circular with a radius equal to the radius of the outer surface of the gear in the transmission to which the power takeoff will attach, flat, or serrated. The housing engagement surface may include one or more recesses, which may be curved, may include a curved surface, or may include a flat surface. The distance between the gear engaging surface and the housing engaging surface may equal the distance between the power takeoff surface for engaging the transmission housing and the portion of the power takeoff gear that engages the gear in the transmission.

Still other example embodiments include inserting a gauge into a power takeoff opening of a transmission; abutting a transmission member with the gauge, the transmission member being selected from the group consisting of a power takeoff opening of the transmission and a transmission gear; and determining an overall gasket thickness to be disposed between a power takeoff and the power takeoff opening of the transmission based on which transmission member is abutted by the gauge during said abutting. Establishing the overall gasket thickness on the power takeoff opening of the transmission based on which transmission member is abutted by the gauge during said abutting may be included, where the overall gasket thickness may be zero. The establishing act may include increasing the overall gasket thickness when the transmission member abutted by the gauge is the transmission gear or may include decreasing the overall gasket thickness when the transmission member abutted by the gauge is the transmission housing. The establishing act may also include removing a gasket from the power takeoff opening of the transmission or adding a gasket to the power takeoff opening of the transmission. The establishing act may result in no gaskets being disposed on the power takeoff opening and may include reducing backlash and/or reducing gear interference of a power takeoff mounted to the transmission. Embodiments may include removing the gauge from the power takeoff opening and attaching a power takeoff to the power takeoff opening, and the acts of removing and attaching may occur when the abutting includes abutting the power takeoff opening of the transmission with the gauge, and forming a gap between the transmission gear and the gauge of at least $2/1000$ inches and at most $3/1000$ inches, or the acts of removing and attaching may occur after the abutting includes abutting the power takeoff opening of the transmission with the gauge and after the abutting results in the transmission gear and the gauge being in contact with one another or forming a gap up to $20/1000$ inches between one another. The determining act may result in no adjustments to the overall gasket thickness prior to attaching a power takeoff to the power takeoff opening of the transmission when the transmission member abutted by the gauge is the transmission housing and the transmission gear. The power takeoff opening of the transmission may include at least one gasket disposed on the transmission housing, or may not include a gasket disposed on the transmission housing. The gauge may be of unitary construction and/or may be T-shaped with a gear engaging surface on the bottom of the T and two housing engaging surfaces on the top cross-member portion of the T. The gauge may include a surface for engaging the power takeoff opening of the transmission that includes a recessed portion. The act of determining may be based on the distance separating the gauge and the transmission member not abutted by the gauge.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not intended to address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF DRAWINGS

Some of the figures shown herein may include dimensions or may have been created from scaled drawings. However, such dimensions, or the relative scaling within a figure, are by way of example, and not to be construed as limiting.

FIG. 3 is front elevational view of the implement provided by another embodiment of this disclosure.

FIG. 4 is a side elevational view of the implement depicted in FIG. 3.

FIG. 5 is perspective view of the implement depicted in FIG. 3.

DETAILED DESCRIPTION OF THE ILLUSTRATED EMBODIMENTS

Figure 1:
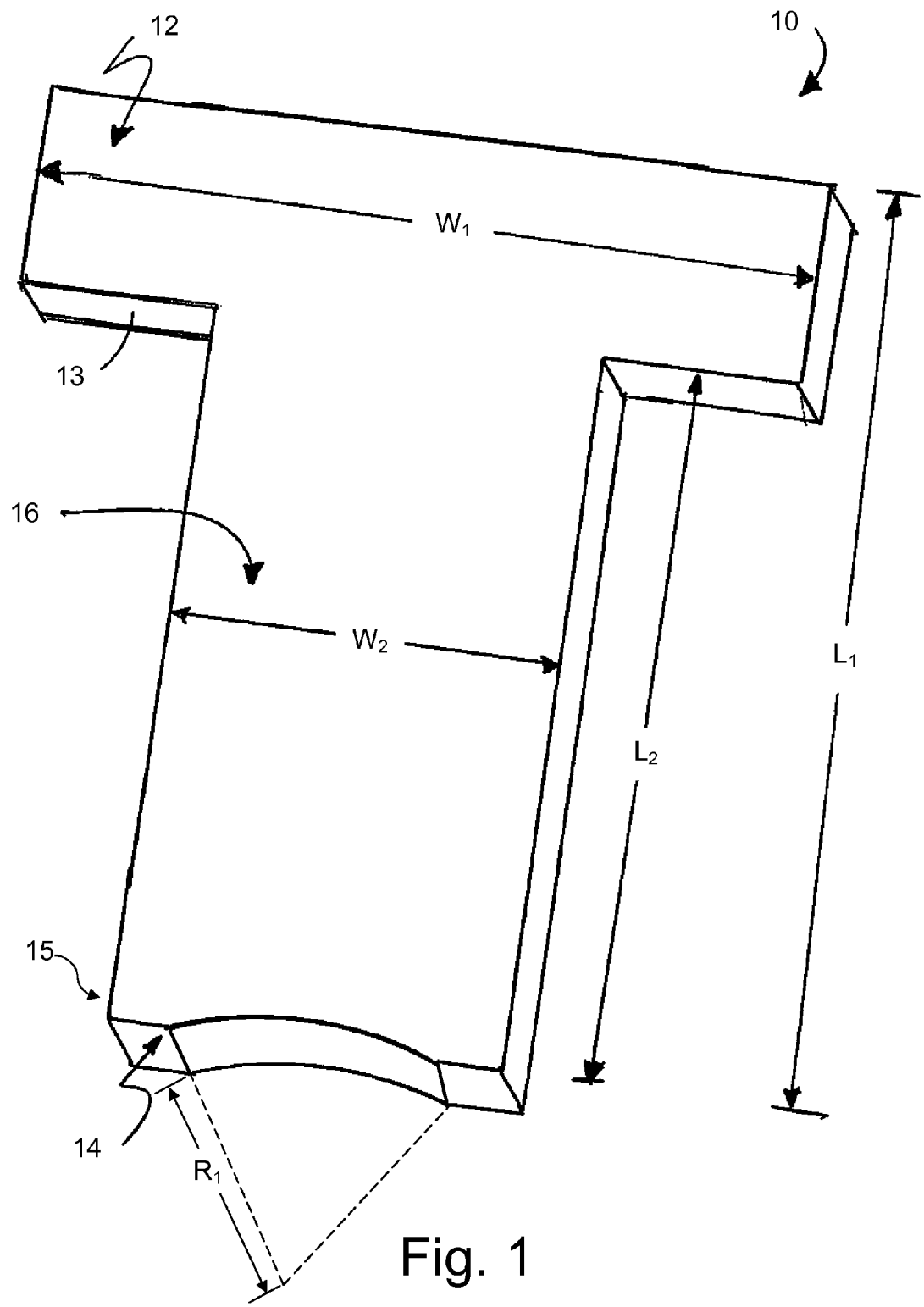
FIG. 1 is a perspective view of the implement provided by one embodiment of this disclosure.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Figure 2:
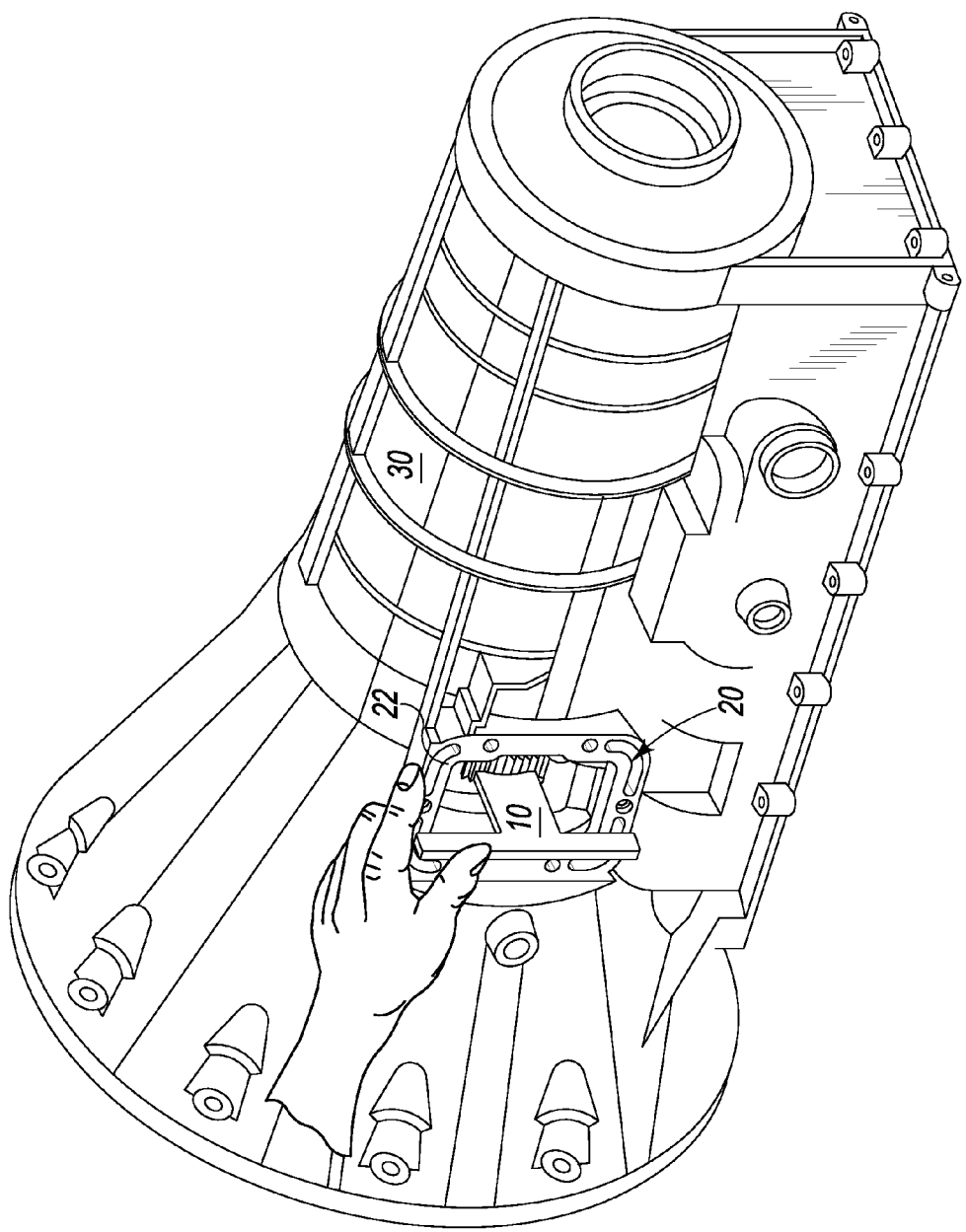
FIG. 2 is a perspective view of a transmission with an embodiment of the implement shown in place during its intended use.

In a first embodiment as shown in FIG. 1, an implement, for example a PTO gasket selection tool 10, is provided having a proximal (first) end 12, a distal (second) end 15 and an elongated central portion 16 extending therebetween. Tool 10 further has two surfaces adapted to abut portions of the transmission to which the PTO attaches. The distance between the two surfaces—depicted generally as $L_2$ in FIG. 1—generally corresponds to the distance the PTO gear that engages the transmission extends out of the PTO housing. This distance is different for different PTOs. One surface—surface 13 of proximal end 12—is adapted to abut the mounting surface 22 at the PTO opening 20 on the transmission housing 30 where the PTO is attached (as best shown in FIG. 2). "Housing" as used herein is the structure to which the PTO attaches when the PTO is attached to the transmission. The other surface—surface 14 of distal end 15—is adapted to abut the transmission gear to which the PTO is operatively coupled.

The elongated portion 16 of tool 10 has a width $W_2$ that is preferably narrower than the PTO opening 20 in the transmission housing 30 to accommodate insertion of the elongated portion 16 of tool 10 into the transmission housing 30 through PTO opening 20. The proximal end 12 of tool 10 has a width $W_1$ that is preferably wider than the PTO opening 20 in the transmission housing 30 so that surface 13 abuts the PTO mounting surface 22 of the transmission housing 30. In one embodiment, width $W_1$ is about 4.0 inches to about 8.0 inches, and width $W_2$ is about 2.0 inches to about 6.20 inches.

As shown in FIG. 1, distal end 15 of tool 10 includes transmission gear-engaging surface 14, which is optionally curved. In the illustrated embodiment, surface 14 is curved with a radius $R_1$. The radius $R_1$ of curved portion 14 is set to accommodate and abut the gear to which the PTO is to be coupled. In at least one example embodiment, radius $R_1$ is equal to the radius of the outer surface of the transmission gear to which the PTO will attach. In at least one additional embodiment, the radius $R_1$ is about 2.0 to about 5.0 inches.

The thickness of tool 10 is generally sufficient to resist bending when in use. In one embodiment, the thickness of tool 10 is about ⅛ of an inch (0.125 inches) to about ½ of an inch (0.5 inches).

Referring specifically now to FIG. 2, the tool 10 is shown inserted through a PTO opening 20 of a transmission housing 30. In use, the user will place one or more gaskets on the PTO mounting surface 22 of opening 20 to achieve an overall gasket thickness that the user estimates to be appropriate for mounting the PTO to the transmission. Next, the user inserts the distal end 15 of tool 10 through the PTO opening 20. If the overall thickness of the one or more gaskets is insufficient (i.e., too thin), the surface 14 of distal end 15 will abuttingly engage the transmission gear before surface edge 13 of proximal end 12 engages the one or more gaskets, forming a gap between the edge 13 of proximal end 12 and the one or more gaskets on the PTO mounting surface 22 of PTO opening 20. In this situation, the user would typically increase the overall gasket thickness at the PTO opening 20 by adding another gasket and/or replacing one or more gaskets with one or more thicker gaskets, then once again insert tool 10 through the opening 20 and evaluate whether the overall gasket thickness is appropriate. The amount by which the user can increase the overall gasket thickness by can be estimated as being approximately equal to (or slightly less than) the gap between the edge 13 of proximal end 12 and the one or more gaskets on the PTO mounting surface 22 of PTO opening 20 (or the PTO mounting surface 22 itself if there are no gaskets). This process can be repeated until the overall thickness of the one or more gaskets is increased sufficiently for the edge 13 of the proximal end 12 of tool 10 to abuttingly engage the PTO mounting surface 22 of the PTO opening 20 before surface 14 of distal end 15 engages the transmission gear, i.e., with a small gap existing between surface 14 of tool 10 and the transmission gear. At this point the mounting of the PTO to the transmission housing 20 will result in no (or at least minimal) gear interference and no (or at least minimal) backlash.

In certain embodiments, this process is repeated until the overall thickness of the one or more gaskets is increased by the smallest amount available, e.g., by the smallest increase in gasket thickness available, to result in the edge 13 of the proximal end 12 of tool 10 abuttingly engaging the PTO mounting surface 22 before surface 14 of distal end 15 engages the transmission gear. In at least one embodiment, the surface 14 and the transmission gear may contact one another. In some embodiments, this process is repeated until the distance separating surface 14 and the transmission gear is no closer than touching and no larger than twenty thousandths of an inch ($20/1000$ inches). In other embodiments, the process is repeated until the distance separating surface 14 and the transmission gear is no closer than one thousandth of an inch ($1/1000$ inches) and no larger than ten thousandths of an inch ($10/1000$ inches). In still further embodiments, the process is repeated until the distance separating surface 14 and the transmission gear is no closer than two thousandth of an inch ($2/1000$ inches) and no larger than three thousandths of an inch ($3/1000$ inches).

Depicted in FIGS. 3-5 is a PTO gasket selection tool 110 according to another embodiment of the present disclosure. Tool 110 includes a first proximal end 112, a second distal end 115, and an elongated central portion 116 extending therebetween. First (proximal) end 112 further includes surface 113, which is adapted to engage the housing of the transmission to which the PTO will be attached. Second (distal) end 115 includes a gear engagement portion 114, which is adapted to engage the teeth of the transmission gear to which the PTO will be mounted. The distance 117 between surface 113 and gear engagement portion 114 corresponds to the distance the PTO gear that engages the transmission extends out of the PTO housing, which is generally different for different PTO models. In the depicted embodiment, gear engagement portion 114 includes a series of serrations, for example teeth 118, that mesh with the teeth of the transmission gear to which gear engagement portion 114 abuts.

Surface 113 of tool 110 (and/or surface 13 of tool 10) optionally includes one or more recesses 119 that can assist the user in aligning tool 110. For example, as tool 110 is inserted into the transmission housing, the user can maneuver tool 100 to maintain alignment of tool 110 by maintaining the one or more recesses 119 in similar locations with respect to opening 120.

The one or more optional recesses 119 can further assist the user in determining the proper overall gasket thickness. For example, in certain embodiments the width and depth of the one or more recesses 119 are sized to allow a portion of the transmission housing 130, such as a flange surrounding opening 120, to fit within recesses 119 when tool 110 is properly aligned and the overall gasket thickness is appropriate to minimize backlash and gear interference. In one embodiment, the flange fits within recesses 119 but does not contact the surface of recesses 119 when the overall gasket thickness is proper and the tool 110 is aligned. In another embodiment, the flange fits within recesses 119 and contacts the surface of recesses 119 when the overall gasket thickness is proper and the tool 110 is aligned. For example, after the overall gasket thickness has been increased by the smallest amount available to result in the flange fitting within recess 119 and contacting the edge of recess 119 before gear engagement portion 114 of distal end 115 engages the transmission gear, i.e., with a small gap existing between gear engagement portion 114 of tool 110 and the transmission gear.

The shape of the one or more recesses 119 may vary. For example, in some embodiments the one or more recesses 119 include curved sides, which may include elliptical curves, any type of conical curve, irregular curves, or non-conic curves. In other embodiments, the one or more recesses 119 include straight sides, and may have an overall square, rectangular, trapezoidal, triangular, regular or irregular appearance. In some embodiments the one or more recesses includes straight and curved sides. In some embodiments, the shape of one recess 119 is different from the shape of another recess 119 on the same tool 110.

Elongated portion 116 of tool 110 has a width that is preferably narrower than the PTO opening 120 in the transmission housing 130 to accommodate insertion of the elongated portion 116 into the transmission through PTO opening 120. See FIGS. 6 and 7. The proximal end 112 of tool 110 has a width that is preferably wider than PTO opening 120 in transmission housing 130 so that edge 113, which includes recess 119, abuts PTO mounting surface 122 of transmission housing 130. In this alternative embodiment, tool 110 has a width $W_1$ that can be about 5.0 inches to about 6.0 inches, and width $W_2$ can be about 2.0 inches to about 4.0 inches. The radius $R_1$ of curved portion 14 is set to accommodate and abut the gear to which the PTO is to be operatively coupled. In this embodiment, radius $R_1$ can be about 2.0 to about 3.0 inches.

Figure 6:
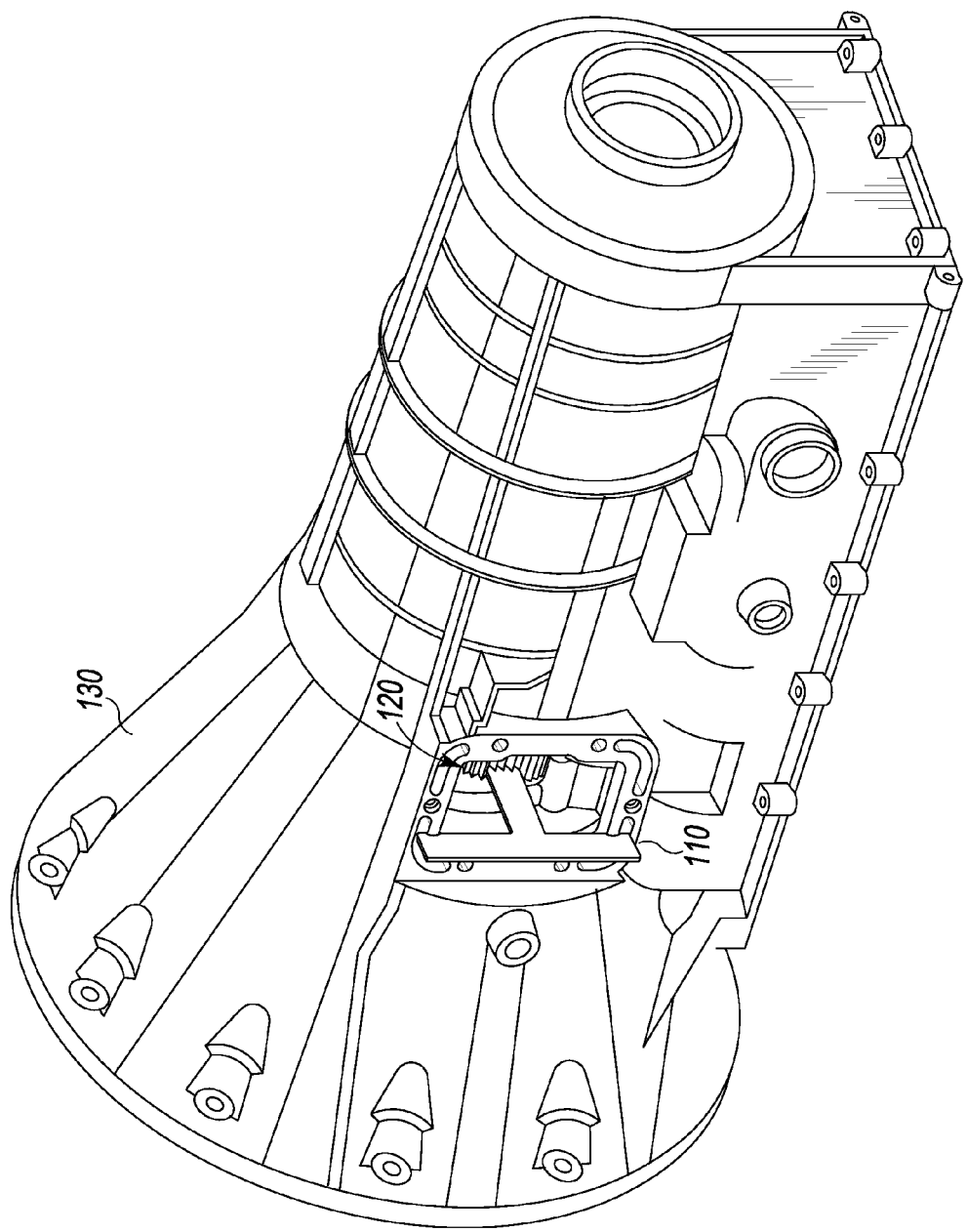
FIG. 6 is perspective view of the implement depicted in FIG. 3 in use with a transmission.
Figure 7:
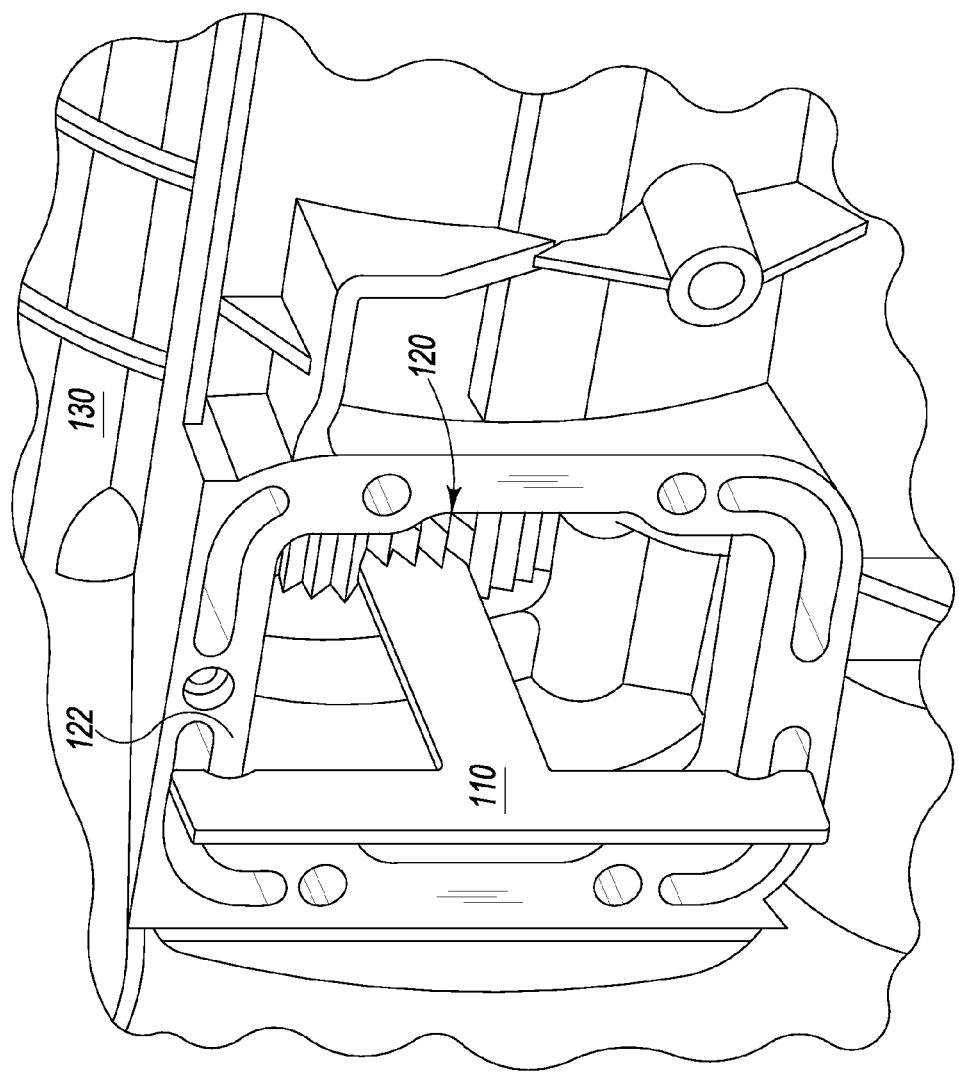
FIG. 7 is partial view of the implement in use as depicted in FIG. 6.

With specific reference to FIGS. 6 and 7, tool 110 is shown inserted through PTO opening 120 of transmission housing 130. In use, the user places the number of gaskets on PTO mounting surface 122 that the user expects to be sufficient for mounting the PTO. Next, the user inserts tool 110 through PTO opening 120 with distal end 115 being inserted first. If the gasket's thickness is not sufficient, gear engagement portion 114 will abuttingly engage the transmission gear with a gap existing between surface 113 and the PTO mounting surface 122 of transmission housing 130. Next, the user would then increase gasket thickness at PTO opening 120, then again insert tool 110 through opening 120 to engage gear engagement portion 114 with the transmission gear. This process can be repeated until the overall thickness of the one or more gaskets is increased by the smallest amount available to result in the edge 113 of the proximal end 112 abuttingly engaging the PTO mounting surface 122 of the PTO opening 120 before gear engagement portion 114 engages the transmission gear, i.e., with a small gap existing between surface 14 of tool 10 and the transmission gear.

Although surfaces 14/114 of tool 10/110 are depicted above as being curved or serrated, this description is not limiting. Other embodiments include surfaces 14/114 that are shaped differently. For example, in some embodiments surface 14/114 is flat, while in another embodiments surface 14/114 is elliptical or of another conic shape, while in still other embodiments surface 14/114 is segmented with two or more surfaces meeting at an angle (i.e., V-shaped, trapezoidal, etc.). In yet another embodiments, surface 14/114 is curved with the same curvature as the transmission gear to which the PTO attaches. In still further embodiments, surface 14/114 has a curve that is irregular or is not a conic shape.

A method of using the implement as described above is also provided by this disclosure to ensure no gear interference and minimal PTO backlash when the PTO is installed on the transmission.

Although tools 10 and 110 are depicted as being of unitary construction (constructed of a single piece, e.g., monolithic), alternate embodiments contemplate tools that are not so constrained. For example, alternate embodiments include two or more pieces that may be connected to one another (or otherwise readied for use, e.g., unfolded) prior to insertion within the transmission housing. The pieces may be connected to one another by various structures, such as clips, hinges, and magnets.

Moreover, although tools 10 and 110 are depicted as being generally flat (e.g., residing generally in a single plane), alternate embodiments contemplate tools that are not so constrained. For example, at least one alternate embodiment includes proximal ends 12/112 (or distal ends 15/115) with one or more portions extending out of the plane of the rest of tool 10/110, which can form more than two transmission housing contact surfaces 13/113, such as by having a second proximal end portion extending perpendicularly to the depicted proximal end 12/112 and forming what would resemble a "plus-sign" when the tool 10/110 is viewed from the proximal end 12/112 to the distal end 15/115 (or vice versa), such as how tool 10/110 would generally be viewed by a user after tool 10/110 has been inserted into the transmission housing. Still other example embodiment is T-shaped or Y-shaped when viewed from the proximal end 12/112 to the distal end 15/115 (or vice versa). Yet further embodiments include a proximal end 12/112 oriented perpendicularly to distal end 15/115, such as to form either a T-shape or an L-shape when the tool 10/110 is viewed as depicted in FIG. 4.

While examples, representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the disclosure are desired to be protected.

What is claimed is:

1. An apparatus for determining the thickness of one or more gaskets to be mounted between a power takeoff and a transmission, the power takeoff including a surface for engaging the transmission housing and a gear for engaging a gear in the transmission, the apparatus comprising:
a tool including a gear engaging surface configured and adapted to abuttingly engage a gear in a transmission, and a housing engaging surface configured and adapted to abuttingly engage a transmission housing,
wherein the distance between the gear engaging surface and the housing engaging surface equals the distance between the power takeoff surface for engaging the transmission housing and the power takeoff gear for engaging the gear in the transmission.

2. The apparatus of claim 1, wherein the tool is T-shaped with the gear engaging surface being on the bottom of the T and the housing engaging surface being on the top cross-member portion of the T.

3. The apparatus of claim 1, wherein the tool is generally flat.

4. The apparatus of claim 1, wherein the gear engaging surface is curved.

5. The apparatus of claim 1, wherein the gear engaging surface is circular with a radius equal to the radius of the outer surface of the gear in the transmission to which the power takeoff will attach.

6. The apparatus of claim 1, wherein the gear engaging surface is flat.

7. The apparatus of claim 1, wherein the gear engaging surface is serrated.

8. The apparatus of claim 1, wherein the housing engagement surface includes one or more recesses.

9. The apparatus of claim 8, wherein the one or more recesses are curved.

10. The apparatus of claim 8, wherein the one or more recesses include a curved surface.

11. The apparatus of claim 8, wherein the one or more recesses include a flat surface.

12. The apparatus of claim 8, wherein the gear engaging surface is serrated.

13. The apparatus of claim 1, wherein the distance between the gear engaging surface and the housing engaging surface equals the distance between the power takeoff surface for engaging the transmission housing and the portion of the power takeoff gear that engages the gear in the transmission.

14. The apparatus of claim 1, wherein the tool is of unitary construction.

15. A method, comprising the acts of:
inserting a gauge into a power takeoff opening of a transmission;
abutting a transmission member with the gauge, the transmission member being selected from the group consisting of a power takeoff opening of the transmission and a transmission gear; and
determining an overall gasket thickness to be disposed between a power takeoff and the power takeoff opening of the transmission based on which transmission member is abutted by the gauge during said abutting.

16. The method of claim 15, further comprising:
establishing the overall gasket thickness on the power takeoff opening of the transmission based on which transmission member is abutted by the gauge during said abutting.

17. The method of claim 16, wherein the overall gasket thickness is zero.

18. The method of claim 16, wherein said establishing includes increasing the overall gasket thickness when the transmission member abutted by the gauge is the transmission gear.

19. The method of claim 16, wherein said establishing includes increasing the overall gasket thickness when the transmission member abutted by the gauge is the transmission gear and is not the power takeoff opening.

20. The method of claim 16, wherein said establishing includes decreasing the overall gasket thickness when the transmission member abutted by the gauge is the transmission housing.

21. The method of claim 16, wherein said establishing includes decreasing the overall gasket thickness when the transmission member abutted by the gauge is the transmission housing and not the transmission gear.

22. The method of claim 16, wherein said establishing includes removing a gasket from the power takeoff opening of the transmission.

23. The method of claim 16, wherein said establishing includes adding a gasket to the power takeoff opening of the transmission.

24. The method of claim 16, wherein said establishing results in no gaskets being disposed on the power takeoff opening.

25. The method of claim 16, further comprising reducing backlash and reducing gear interference of a power takeoff mounted to the transmission by said establishing.

26. The method of claim 15, further comprising:
removing the gauge from the power takeoff opening; and
attaching a power takeoff to the power takeoff opening.

27. The method of claim 26, wherein said removing and said attaching occur when said abutting includes:
abutting the power takeoff opening of the transmission with the gauge, and
forming a gap between the transmission gear and the gauge of at least $2/1000$ inches and at most $3/1000$ inches.

28. The method of claim 26, wherein said removing and said attaching occur after:
said abutting includes abutting the power takeoff opening of the transmission with the gauge, and
said abutting results in the transmission gear and the gauge being in contact with one another or forming a gap up to $20/1000$ inches between one another.

29. The method of claim 15, wherein said determining results in no adjustments to the overall gasket thickness prior to attaching a power takeoff to the power takeoff opening of the transmission when the transmission member abutted by the gauge is the transmission housing and the transmission gear.

30. The method of claim 15, wherein the power takeoff opening of the transmission includes at least one gasket disposed on the transmission housing.

31. The method of claim 15, wherein the power takeoff opening of the transmission does not include a gasket disposed on the transmission housing.

32. The method of claim 15, wherein the gauge is of unitary construction.

33. The method of claim 15, wherein the gauge is T-shaped with a gear engaging surface on the bottom of the T and two housing engaging surfaces on the top cross-member portion of the T.

34. The method of claim 15, wherein the gauge includes a surface for engaging the power takeoff opening of the transmission, the surface including a recessed portion.

35. The method of claim 15, wherein said determining is based on the distance separating the gauge and the transmission member not abutted by the gauge.

* * * * *